Dec. 1, 1925.
H. C. ZAUN
SIGNAL
Filed May 19, 1924
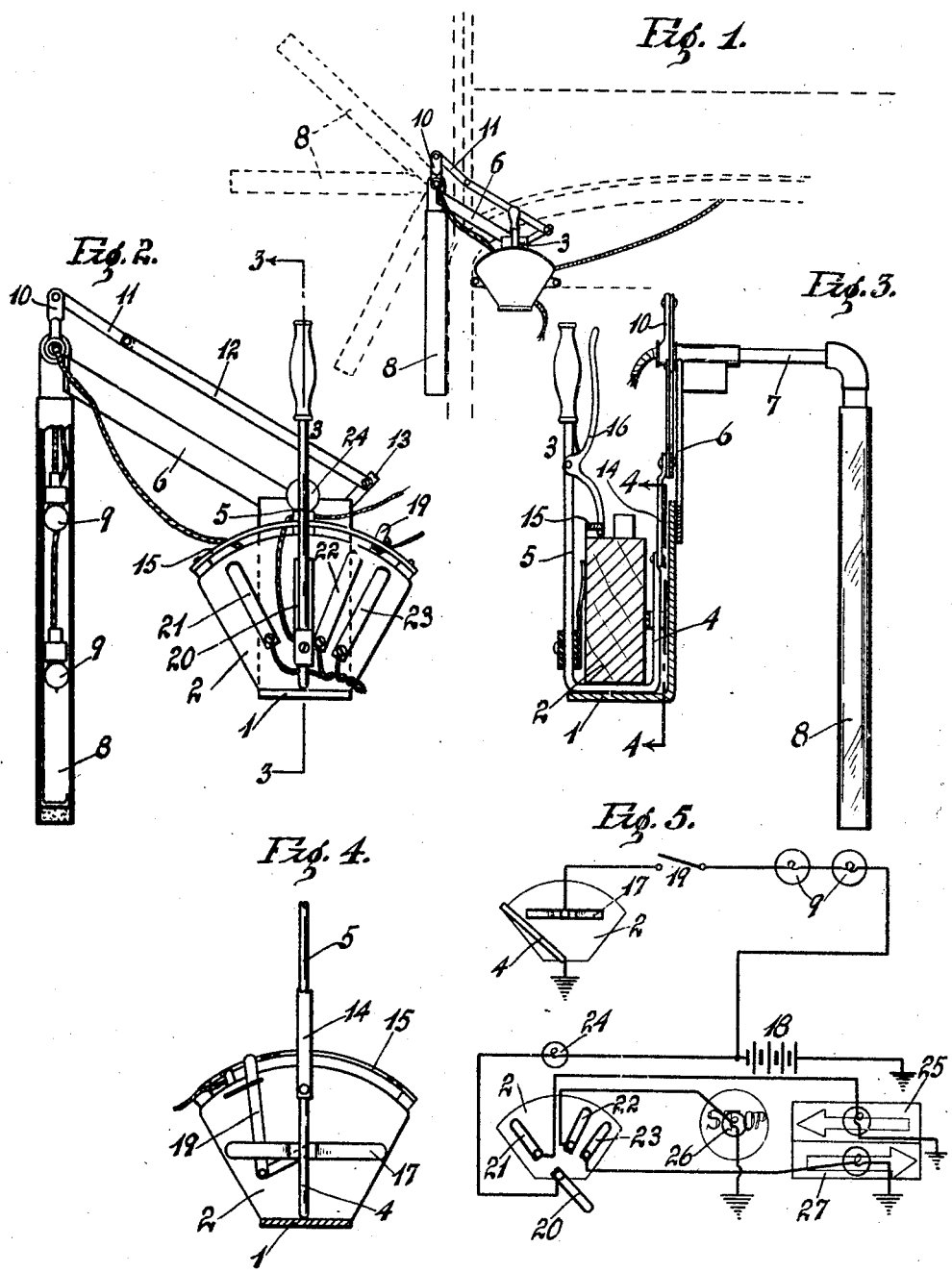
INVENTOR
HENRY CARL ZAUN.

Patented Dec. 1, 1925.

1,563,821

UNITED STATES PATENT OFFICE.

HENRY CARL ZAUN, OF OAKLAND, CALIFORNIA.

SIGNAL.

Application filed May 19, 1924. Serial No. 714,305.

*To all whom it may concern:*

Be it known that HENRY CARL ZAUN, a citizen of the United States, residing at Oakland, in the county of Alameda and State of California, has invented certain new and useful Improvements in Signals, of which the following is a specification.

My invention is an improved signal particularly applicable to automobile vehicles.

The object of my invention is to provide a manually controlled signal arm which may be readily placed in the signaling position, with a minimum effort on the part of the driver. The structure of my signal device comprises a fixed supporting arm which is fastened to the body of the vehicle, and at its outer end carries a tube pivoted thereto with signal lights in the tube. A handle lever mounted in a convenient place accessible to the driver swings across a segment having notches to hold it in the different positions. A bell crank is connected at the handle lever, and by a link swings the tube having the light and thereby gives the different signal indications.

Another object is to provide electrical contacts on the manual control which illuminate signals at the rear of the automobile.

In the annexed drawing in which my invention is illustrated:

Figure 1 is a front elevation of my signal.

Figure 2 is an enlarged view of the same with the cover removed and parts broken away to show the construction.

Figure 3 is a sectional view taken on the line 3—3 of Fig. 2.

Figure 4 is a sectional view taken on the line 4—4 of Fig. 3.

Figure 5 is a diagrammatic view of the wiring arrangement.

Referring more particularly to the drawing, my signal consists of an L-shaped bracket 1, which is adapted to be secured to the instrument board, close to the outer edge thereof.

A block of insulation 2 is secured to the horizontal arm of the bracket 1, and a U-shaped handle 3 is journaled in the said block, with the arm 4 of said handle positioned at the back of said block, and the arm 5 at the front of said block.

A supporting arm 6 is secured to the bracket 1, and extends over the side of the vehicle, and a hollow rod 7 is suitably journaled at the outer end of said arm. Depending from the end of the rod 7 is a transparent red tube 8 in which light bulbs 9—9 are mounted. A projection 10 rises from the rod 7 and a link 11 is pivoted thereto, and to one end of an arm 12, the other end of which arms is pivoted to a lug 13 on the arm 6. A link 14 is pivoted to the arms 4 and 12 from which it will be seen that as the arm 4 is swung from side to side the arm 12 will be depressed which in turn rotates the rod 7 through the pin 10 and thus swings the tube 8 outwardly into the required signaling position. In order that the tube 8 may be held in the desired signal position, a segment 15 is secured to the block 2, which has suitably positioned notches adapted to receive a spring pawl 16 mounted upon the arm 5 of the handle 3.

As the handle 3 is swung to operate the signal tube 8 the arm 4 engages a spring contact 17 on the block 2, which lights the bulbs 9 from the battery 18. A switch 19 in this light circuit enables the lights to be shut off during the day if desired.

The operation of the signal is as follows:—When the U-shaped handle 3 is swung to give a signal indication, the arm 6 reciprocates the arm 12 and thus pulls on the link 11 in the position shown in Figures 1 and 2. This swings the tube 8 from the position shown in full lines in Figure 1 to those shown in dotted lines. The spring pawl 16 may be secured in any of the notches in the segment 15 to hold the signal in adjusted position.

A contact finger 20 is mounted upon the arm 5 and insulated therefrom. As the arm swings to move the tube 8 into the various signaling positions, the contact finger 20 engages contact plates 21, 22 and 23, which are secured to the block 2 at the left turn, stop, and right turn positions respectively.

The lead from the battery 18 extends through a pilot light 24 to the finger 20, and the contacts 21, 22 and 23 are connected to bulbs in the left turn signal 25, stop signal 26, and right turn signal 27, respectively, which are mounted at the rear of the vehicles.

Having described my invention, I claim:

1. A vehicle signal comprising a bracket, a handle journaled on said bracket, an arm extending outwardly from said bracket, a signaling tube journaled at the end of said arm, a second arm pivoted above said first named arm, a link pivoted to said second arm and operatively connected to said tube, and a second link pivoted to said handle and to said second arm whereby said arm is swung to actuate said signal tube.

2. A vehicle signal comprising a bracket, a handle journaled on the bracket, a supporting arm carried by the bracket in fixed position, a signaling tube pivotally mounted on the arm, a link and arm pivotally connected to the handle and a link operatively connected from the said arm to the signal tube.

3. A vehicle signal comprising in combination a bracket, a fixed supporting arm secured thereto, a U-shaped handle pivotally mounted on the bracket, a signal tube swiveled on the supporting arm, an arm pivoted to the U-shaped handle, a lever connected to the signal tube, and a link connecting the said arm and the said lever to operate the signal tube in accordance with the movement of the handle.

In testimony whereof I affix my signature.

HENRY CARL ZAUN.